(12) United States Patent
Reifen et al.

(10) Patent No.: US 12,349,703 B2
(45) Date of Patent: Jul. 8, 2025

(54) CHICKPEA PROTEIN CONCENTRATE

(71) Applicant: Yissum Research Development Company of the Hebrew University of Jerusalem Ltd., Jerusalem (IL)

(72) Inventors: Ram Reifen, Rehovot (IL); Shimrit Bar-El Dadon, Rehovot (IL); Martin Schuring, Bremerhaven (DE)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 0 days.

(21) Appl. No.: 16/316,099

(22) PCT Filed: Jul. 9, 2017

(86) PCT No.: PCT/IL2017/050768
§ 371 (c)(1),
(2) Date: Jan. 8, 2019

(87) PCT Pub. No.: WO2018/011786
PCT Pub. Date: Jan. 18, 2018

(65) Prior Publication Data
US 2020/0390131 A1 Dec. 17, 2020

Related U.S. Application Data

(60) Provisional application No. 62/429,890, filed on Dec. 5, 2016, provisional application No. 62/360,388, filed on Jul. 10, 2016.

(51) Int. Cl.
A23L 11/30 (2016.01)
A23C 20/02 (2025.01)
(Continued)

(52) U.S. Cl.
CPC ............ *A23L 11/34* (2016.08); *A23C 20/025* (2013.01); *A23J 1/14* (2013.01); *A23J 3/227* (2013.01); *A23V 2002/00* (2013.01)

(58) Field of Classification Search
CPC ..... A23L 1/34; A23J 1/14; A23J 3/227; A23C 20/025; A23V 2002/00
(Continued)

(56) References Cited

U.S. PATENT DOCUMENTS 3,635,726 A   1/1972   Sair
3,660,111 A   5/1972   Koch
(Continued)

FOREIGN PATENT DOCUMENTS

CN   105707408 A   6/2016
DE   1 301 235 B   8/1969
(Continued)

OTHER PUBLICATIONS

Ionescu et al. The Annals of the University Dunarea de Jos of Galati Fascicle VI-Food Technology, New Series Year III (XXXIII) Paper presented at the International Symposium Euro—aliment 2009, Oct. 9-10, 2009, Galati—Romania. (Year: 2009).*
(Continued)

*Primary Examiner* — Subbalakshmi Prakash
(74) *Attorney, Agent, or Firm* — PEARL COHEN ZEDEK LATZER BARATZ LLP (57) ABSTRACT

Provided are debittered chickpea based protein concentrates, methods of manufacturing thereof and food products comprising the protein concentrates.

4 Claims, 1 Drawing Sheet

(51) Int. Cl.
  *A23J 1/14* (2006.01)
  *A23J 3/22* (2006.01)
(58) Field of Classification Search
  USPC .......................................................... 426/656
  See application file for complete search history.

(56) References Cited

U.S. PATENT DOCUMENTS

| | | | |
|---|---|---|---|
| 3,736,147 | A | 5/1973 | Iacobucci |
| 3,968,097 | A | 7/1976 | Groux |
| 4,118,164 | A | 10/1978 | Wenger et al. |
| 4,600,311 | A | 7/1986 | Mourrier et al. |
| 4,677,065 | A | 6/1987 | Buchbjerg |
| 5,989,620 | A | 11/1999 | Wang et al. |
| 6,777,016 | B2 | 8/2004 | Thresher |
| 6,818,246 | B2 | 11/2004 | Singh |
| 7,097,874 | B2 | 8/2006 | Meibach |
| 7,485,332 | B2 | 2/2009 | Chu |
| 9,713,339 | B2 | 7/2017 | Melliou |
| 2011/0097448 | A1* | 4/2011 | Wong ................ A23J 3/34 426/72 |
| 2013/0196028 | A1 | 8/2013 | Marko et al. |
| 2014/0030421 | A1* | 1/2014 | Markedal ............ A23L 11/35 426/634 |
| 2015/0296834 | A1 | 10/2015 | Geistlinger |
| 2016/0309743 | A1 | 10/2016 | Spinelli et al. |

FOREIGN PATENT DOCUMENTS

| | | |
|---|---|---|
| EP | 2984936 A1 | 2/2016 |
| GB | 1574110 A | 9/1980 |
| GB | 2 412 834 A | 10/2005 |
| JP | 54-28843 | 3/1979 |
| RU | 2346456 C1 | 2/2009 |
| WO | 2008/056360 A2 | 5/2008 |
| WO | 2011/095975 A1 | 8/2011 |
| WO | 2018/122607 A1 | 7/2018 |

OTHER PUBLICATIONS

Mukai et al. Chem. Pharm. Bull. 55(11) 1581-1584 (2007) https://www.jstage.jst.go.jp/article/cpb/55/11/55_11_1581/_article (Year: 2007).*

Romero-Barazini et al. Journal of Food Processing and Preservation / vol. 19, Issue 5, Nov. 1995. (Year: 1995).*

Andersen et al. (CN103402366 A1)—Machine translation of description (Year: 2013).*

Alarcón-Valdez et al., (2005), "Infant food from quality protein maize and chickpea: Optimization for preparing and nutritional properties", Int J Food Sci Nutr, vol. 56, No. 4, pp. 273-285.

Aluko et al., (1993), "Relationship of Hydrophobicity and Solubility with Some Functional Properties of Cowpea (*Vigna unguiculata*) Protein Isolate", Journal of the Science of Food and Agriculture, vol. 62, No. 4, pp. 331-335.

Burgess et al., (1979), "Technical note: Selected functional properties of a whey protein isolate", Journal of Food Technology, vol. 14, No. 3, pp. 325-329.

Ibanoglu et al., (2006), "Physical and sensory evaluation of a nutritionally balanced gluten-free extruded snack", Journal of Food Engineering, vol. 75, No. 4, pp. 469-472.

Khaleque et al., (1985), "Studies on the development of infant foods from plant protein sources. Part III. Preparation, processing and properties of various products developed", Arch Latinoam Nutr, vol. 35, No. 4, pp. 696-710.

Martínez-Maqueda et al., (2013), Extraction/Fractionation Techniques for Proteins and Peptides and Protein Digestion. In: Toldré F., Nollet L. (eds) Proteomics in Foods. Food Microbiology and Food Safety, vol. 2. Springer, Boston, MA; pp. 21-50.

Sathe et al., (1981), "Functional Properties of the Great Northern Bean (*Phaseolus vulgaris* L.) Proteins: Emulsion, Foaming, Viscosity, and Gelation Properties", Journal of Food Science, vol. 46, No. 1, pp. 71-81.

Sathe et al., (1982), "Functional Properties of Winged Bean [*Psophocarpus tetragonolobus* (L.) DC] Proteins", Journal of Food Science, vol. 47, No. 2, pp. 503-509.

Sathe et al., (1982), "Functional Properties of Lupin Seed (*Lupinus mutabilis*) Proteins and Protein Concentrates", Journal of Food Science, vol. 47, No. 2, pp. 491-497, 502.

Tharanathan et al., (2003), "Grain legumes—a boon to human nutrition", Trends in Food Science & Technology, vol. 14, No. 12, pp. 507-518.

Anonymous: "Limagrain Launches Functional Flours for Clean Label and Gluten-Free Pasta", Food Ingredients 1st, Feb. 16, 2015 (Feb. 16, 2015). Retrieved from the Internet: URL: http://www.foodingredientsfirst.com/news/Limagrain-Launches-Functional-Flours-for-Clean-Label-and-Gluten-Free-Pasta.html [retrieved on Sep. 27, 2017]. XP002774206.

Anonymous: Limagrain Cereals Ingredients Product Information Sheet: Pulses [retrieved on Sep. 27, 2017].

Mokni Ghribi et al., (2015) Effects of enzymatic hydrolysis on conformational and functional properties of chickpea protein isolate. Food Chem 187: 322-330.

Mondor et al., (2009) Influence of processing on composition and antinutritional factors of chickpea protein concentrates produced by isoelectric precipitation and ultrafiltration. Innovative Food Science & Emerging Technologies 10(3): 342-347.

Rickert et al., (2004) Effect of Extraction pH and Temperature on Isoflavone and Saponin Partitioning and Profile During Soy Protein Isolate Production. Journal of Food Science 69(8): C623-C631.

Office Action for JP Application No. 2019-500411, mailed on Dec. 8, 2020.

AU Office Action for App. No. 2017294711 dated Mar. 3, 2021.

Barakat Hassan et al, "Stability of saponins from chickpea, soy and faba beans in vegetarian, broccoli-based bars subjected to different cooking techniques," Food Research International, Elsevier, Amsterdam, NL, vol. 76, Mar. 31, 2015, pp. 142-149, XP029251383, ISSN:0963-9969, DOI:10.1016/J.FOODRES.2015.03.043.

* cited by examiner

CHICKPEA PROTEIN CONCENTRATE

FIELD OF THE INVENTION

The present invention relates to palatable chickpea protein concentrates, in particular to concentrates obtained by a process including a debittering step, methods for manufacturing of the protein concentrates, and food products comprising the protein concentrates.

BACKGROUND OF THE INVENTION

A growing awareness among the public about healthy food and sustainable food sources has led to a rising interest in plant protein based foods. The proportion of people that reduce their meat consumption is steadily increasing. This change in eating pattern requires new products that fulfill the consumer demands for healthy and tasty products that replace meat and cheese and have a similar high protein nutritional value.

At present, meat substitutes do not fully meet consumer preferences with regard to sensory quality. In particular, the bite, taste and juiciness scores are low compared to meat. To obtain a larger market share, meat substitutes should preferably resemble a real meat.

Soy protein is the mostly used protein in processed vegetarian foods. However, the use of soy based foods is problematic due to allergenicity issues, genetically modified beans, presence of residual herbicides, and other health concerns including the abundant amount of hormones in soy based foods. This, together with drawbacks of other common vegetarian foods, raises the need for alternative vegetarian, safe and palatable products.

Chickpea, also known as garbanzo beans, is the second most important legume crop around the world. Chickpea is an annual legume crop grown in many countries around the world and a native to the Mediterranean region. Due to its high nutritious value, it became part of the diet in many developing and developed countries around the world. Chickpeas contain vitamin K, folate, phosphorous, zinc, copper, manganese, choline and selenium, as well as high levels of iron, vitamin B-6 and magnesium. Besides being a source of valuable protein, vitamins and minerals, chickpeas are also rich in fiber and low in fat, and have been shown to have health benefits (e.g., lowering cholesterol damage).

US Patent Application Publication No. 2015/0296834 discloses food products having structures, textures and other properties similar to those of animal meat.

US Patent Application Publication No. 2013/0196028 discloses a chickpea soluble fraction enriched with nutritional components and a method of producing same. The application discloses a protein content of at least 90% as compared to starting material (e.g. a final protein content of 20% or more, whereas chickpea seeds contain approximately 20-25% protein by weight). This publication discloses enzymatic digestions with a protease, amylase and phytase, as well as an optional heating step to denature starches and proteins.

PCT Application Publication No. WO2008/056360 to one of the inventors of the present application discloses compositions, infant formulae and nutraceuticals based on whole seeds of chickpeas.

U.S. Pat. No. 6,818,246 discloses a method for manufacturing a soy protein concentrate having a low non-digestible oligosaccharide and high isoflavone content. The method includes the use of a membrane in an ultrafiltration process to separate non-digestible oligosaccharide from protein, while retaining isoflavones and saponins with protein.

US Patent Application Publication No. 2016/0309743 discloses a method for generating a protein concentrate comprising generating an initial alkalized slurry by combining flour, water and a base and generating a solubilized rich protein stream by separating the solubilized protein rich stream and generating a protein precipitate including an acid curd by mixing the de-oiled solubilized rich protein stream with an acid and separating the acid curd from the protein precipitate. The US application, published after the priority of the present application, may further includes the use of proteases.

There is an unmet need for vegetarian protein concentrates that are suitable as a source material for a variety of food products having improved flavors and textures, as well as high nutritional value.

SUMMARY OF THE INVENTION

The present invention provides palatable chickpea protein concentrates, food products comprising the protein concentrates and methods of manufacturing thereof. In particular the present invention provides debittered chickpea highprotein concentrates.

The present invention provides in some embodiments chickpea based meat and cheese substitutes having structures, textures and flavors that resemble animal meat or cheese. The present invention further provides in some embodiments methods for manufacturing debittered chickpea protein concentrates.

The present invention is based in part on the unexpected finding that producing chickpea protein concentrate by a method comprising a step of debittering with fumaric acid, provide a palatable, high quality protein concentrate useful as a source material for a variety of food products. The methods of the invention comprise a debittering step with fumaric acid, separating the precipitated protein, and protein extraction in alkaline conditions.

The teachings of the present invention provide for the first time debittered chickpea protein concentrates that can be further processed to food products that possess textures and structures that resemble animal meat food and thus may serve as a healthy and tasty meat and/or cheese substitutes. Attempts to produce chickpea protein concentrate using hitherto known methods have been encountered by a bitter taste characterizing such preparations, and/or by the need to use and/or residual amounts of non-edible compounds. The protein concentrate described herein is essentially devoid of such bitterness.

The chickpea protein concentrate described herein is useful in numerous food applications to provide thickening, texturing, and structural properties to foods such as meat and cheese analogs. The protein concentrate can be emulsified to provide structure, which gives the protein concentrate a firm bite and a meaty texture.

According to a first aspect, the present invention provides a debittered chickpea protein concentrate comprising a protein content of more than 70% by weight of total dry matter. According to some embodiments, the protein concentrate comprises a protein content of more than 80% by weight of total dry matter. According to certain embodiments, the protein concentrate comprises a protein content of more than 90% by weight of total dry matter. According to some embodiments, the protein concentrate comprises a protein content of between 75% and 85% by weight of total dry matter. According to additional embodiments, the protein concentrate comprises a protein content of between 80% and 95% by weight of total dry matter.

According to some embodiments, the protein concentrate comprises less than 1% phytic acid. According to some embodiments, the protein concentrate comprises less than 0.8% phytic acid. According to some embodiments, the protein concentrate comprises less than 0.6% phytic acid. According to certain embodiments, the protein concentrate comprises less than 0.3% phytic acid. According to certain embodiments, the protein concentrate comprises less than 0.1% phytic acid. According to additional embodiments, the protein concentrate is essentially devoid of phytic acid.

According to some embodiments, the protein concentrate is essentially devoid of bitterness. According to certain exemplary embodiments, the protein concentrate has less bitterness compared to protein concentrates prepared with a process comprising a step of protein precipitation with an acid other than fumaric acid.

According to some embodiments, the protein concentrate comprises less than 0.8 mg/g saponins. According to some embodiments, the protein concentrate comprises less than 0.6 mg/g saponins. According to some embodiments, the protein concentrate comprises less than 0.4 mg/g saponins. According to some embodiments, the protein concentrate comprises less than 0.2 mg/g saponins. According to additional embodiments, the protein concentrate is essentially devoid of saponins.

According to some embodiments, the protein concentrate comprises less than 25% fat. According to additional embodiments, the protein concentrate comprises less than 20%, 18%, 16%, 14%, 12%, 10%, 8% or 5% fat. Each possibility represents a separate embodiment of the invention. According to additional embodiments, the protein concentrate comprises between 5% and 20% fat.

According to some embodiments, the protein concentrate is produced by a method comprising a step of debittering chickpea material. According to some embodiments, the chickpea material is water soaked chickpea flour. According to some embodiments, the debittering step comprises mixing the material with fumaric acid.

According to some embodiments, the method further comprises a step of protein extraction. According to some embodiments, the protein extraction comprises subjecting the material to alkaline conditions.

According to some embodiments, the method comprises mixing fumaric acid to a final concentration of between 0.1% and 1% fumaric acid. According to certain embodiments, the method comprises mixing fumaric acid to a final concentration of between 0.15% and 0.5% fumaric acid.

According to some embodiments, the method comprises a step of alkalizing to a pH value of between 7.5 and 10. According to certain embodiments, the method comprises a step of alkalizing to pH 8. According to certain embodiment, the method comprises a step of alkalizing to pH 9. According to specific embodiments, the method comprises a step of alkalizing to a pH value no greater than pH 9. According to additional embodiments, the method comprises a step of alkalizing to a pH value no greater than pH 10.

According to some embodiments, the step of subjecting the product to alkaline conditions comprises the use of NaOH or KOH.

According to some embodiments, the method comprises acidification to about pH 4.5.

According to some embodiments, the method comprises adding antioxidants to the chickpea material.

According to some embodiments, the method is carried out at a temperature below 25° C. According to some embodiments, the method is carried out at a temperature below 20° C. According to some embodiments, the method is carried out at a temperature of between 0° C. and 15° C. According to certain embodiments, the method is carried out at a temperature of between 0° C. and 10° C. According to certain embodiments, the method is carried out at a temperature of between 5° C. and 15° C.

According to some embodiments, the method does not include adding digestive enzymes.

According to some embodiments, the method does not include adding proteases.

According to some embodiments, the protein concentrate has a neutral taste. According to additional embodiments, the protein concentrate has a palatable taste.

According to an additional aspect, the present invention provides a food product comprising the chickpea protein concentrate of the invention.

According to some embodiments, the food product comprises at least 5% chickpea protein concentrate of the invention. According to some embodiments, the food product comprises at least 20% chickpea protein concentrate of the invention. According to some embodiments, the food product comprises at least 30% chickpea protein concentrate of the invention.

According to some embodiments, the food product is a meat substitute.

According to some embodiments, the food product is a meat analog, including, but not limited to, beef, pork, lamb, chicken and fish meat analogs.

According to other embodiments, the food product is a milk or cheese substitute. According to additional embodiments, the food product is selected from the group consisting of beverages, snacks, bars, sports food, and medical food. Each possibility represents a separate embodiment of the invention.

According to some embodiments, the food product comprises between 0.1% and about 30% by weight of lipid. According to certain embodiments, the food product comprises between 0.5% and about 25% by weight of lipid. According to additional embodiments, the food product comprises between 1% and about 20% by weight of lipid.

According to some embodiments, the food product comprises between about 0.1% to about 10% by weight of one or more binding agents. According to certain embodiments, the food products comprises between about 1% to about 5% by weight of one or more binding agents.

According to some embodiments, the food product comprises 1% to 10% by weight edible fibers. According to some embodiments, the food product comprises 2% to 5% by weight edible fibers.

According to some embodiments, the food product has textures and flavors similar to pasta or noodles.

According to another aspect, the present invention provides a method for manufacturing a debittered chickpea protein concentrate, the method comprising the steps of: (i) providing a water suspension of chickpea material; (ii) debittering the chickpea material; and (iii) extracting the proteins from the product of step (ii).

According to some embodiments, the protein concentrate has a neutral taste. According to additional embodiments, the protein concentrate has a palatable taste.

According to some embodiments, step (ii) comprises mixing the material with fumaric acid.

According to some embodiments, step (ii) comprises mixing fumaric acid to a final concentration of between 0.1% and 1% fumaric acid. According to certain embodiments, step (ii) comprises mixing fumaric acid to a final concentration of between 0.15%-0.5% fumaric acid. According to certain embodiments, step (ii) comprises mixing fumaric acid to a final concentration of about 0.5% fumaric acid. According to other embodiments, step (ii) comprises mixing fumaric acid to a final concentration of about 0.2% fumaric acid.

According to some embodiments, step (ii) comprises acidification to about pH 4.5.

According to some embodiments, step (iii) comprises subjecting the product of step (ii) to alkaline conditions.

According to some embodiments, step (iii) comprises alkalization to a pH value of between 7.5 and 10. According to certain embodiments, step (iii) comprises alkalization to pH 8. According to certain embodiments, step (iii) comprises alkalization to pH 9.

According to some embodiments, subjecting the product to alkaline conditions comprises the use of NaOH or KOH.

According to some embodiments, the soaked chickpea material has between 10 and 25 wt. % solids.

According to some embodiments, the method further comprises a step of concentrating proteins by a process selected from the group consisting of: membrane distillation, nanofiltration, and evaporation. According to certain embodiments, the method further comprises a membrane distillation process.

The proteins are precipitated during the acidification step. According to some embodiments, the method further comprises a step of separation. According to certain exemplary embodiments, the separation is performed by centrifugation. According to other embodiments, the separation is performed by a decanter. According to these embodiments, the separation step is followed by extracting to proteins using alkaline conditions.

According to some embodiments, the method comprising the steps of: (i) providing a water suspension of chickpea material; (ii) debittering the chickpea material; (iii) separating a precipitate that was generated in step (ii); and (iv) extracting the proteins from the product of step (iii).

According to some embodiments, step (iv) is followed by an additional step of separation.

According to certain exemplary embodiments, the method comprises at least 2 cycles of debittering by fumaric acid acidification, followed by protein separation, removing the supernatant and subjecting the debittered material to protein extraction.

Other objects, features and advantages of the present invention will become clear from the following description and drawing.

DETAILED DESCRIPTION OF THE INVENTION

The present invention provides chickpea based protein concentrate, suitable as a source material for the preparation of a variety of food products. The present invention further provides methods of manufacturing palatable chickpea based protein concentrate. The protein concentrates disclosed herein are suitable for preparing meat substitutes having textures and flavors similar to meat. The protein concentrates disclosed herein are also suitable for preparing milk alternatives, protein shakes, sports nutrition, energy bars, snacks and medical food.

The methods of manufacturing protein concentrate as described herein include acidification of a chickpea material using fumaric acid. The methods further comprise an alkalization step to a pH value of between 7.5 and 10. The method of preparing protein concentrate in some embodiments further comprises a step of membrane distillation procedure. Advantageously, the present invention provides methods of manufacturing chickpea protein concentrates with higher yields and reduced level of bitterness. The present invention further provides in some embodiments, methods of manufacturing protein extracts from other legumes.

Without wishing to be bound to any specific mechanism or theory, the debittered taste of the compositions disclosed herein are due, inter alia, to minimal hydrolysis of proteins during the process. It is widely accepted that hydrophobicity and molecular weight of the peptides in a hydrolysate contribute for bitterness. The bitterness taste is also due to the presence of saponins and other antinutrients.

Definitions

As used herein, the term "legume" refers to a plant or fruit/seed in the family Fabaceae (or Leguminosae).

As used herein, the term "chickpea" refers to any type of the species *Cicer arietinum* as well as progeny thereof produced by crosses with other species. The chickpea can be any modified variety obtained from any species of chickpeas such as, but not limited to, chickpeas varieties Desi and Kabuli, such as Spanish Kabuli, 3279 Kabuli, Desi 14088, Desi 8631, Hadas-Kabuli, and Desi 8575.

The term "chickpea flour" as used herein refers to a powder obtained by grinding chickpea grains or parts thereof. The flour includes partly or entirely milled chickpea grains or parts thereof. According to some embodiments, the flour is enriched with a variety of food ingredients, such as, but not limited to, protein and minerals, which are either indigenous or externally supplemented.

The term "protein concentrate" as used herein refers to material obtained from a legume source upon removal of soluble carbohydrate and other constituents that has more than 65% protein on a dry-weight basis.

As used herein, the term "chickpea protein concentrate" refers to chickpea protein-containing material that comprises more than 65% chickpea protein by weight on a moisture free basis. The term "protein concentrate" as used herein also encompasses "protein isolate". Protein isolates are typically defined as materials comprising higher than 85% protein by weight.

The term "debittered protein concentrate" as used herein refers to protein concentrates having less bitterness compared to protein concentrates produced by other methods. In some embodiments, the protein concentrates described herein have a low bitterness score as evaluated in a human gustatory sensation test. For example, the protein concentrates described herein have less bitterness compared to protein concentrates prepared with a process comprising acid protein precipitation with an acid other than fumaric acid. In some embodiments, the decreased bitterness is due to lower concentrations of specific components, e.g., saponins or hydrophobic peptides.

The term "neutral taste" or "neutral flavor" are used herein interchangeably and refer to a flavor that gives a minimized, mild and clean taste.

The term "palatable" is used throughout the specification to describe compositions according to the present invention with respect to their taste. Palatable chickpea protein concentrate according to the present invention are those compositions which are agreeable in taste or are otherwise pleasant-tasting.

As used herein, the term "protein" refers to a polymeric form of amino acids of any length.

The term "food product" as used herein refers to any article that can be consumed (e.g., eaten, drunk, or ingested) by a subject.

The terms "meat analog" and "meat substitute" are used herein interchangeably and refer to a product that is not derived from an animal but has structure, texture, and/or other properties comparable to those of animal meat.

The term "texture" as used herein refers to mechanical characteristics of a food product that are correlated with sensory perceptions of the food product.

As used herein, the term "structure" describes a wide variety of physical properties of a food product. Structure has been defined as the attribute of a substance resulting from a combination of physical properties and perceived by senses of touch, including mouth feel, and sight.

According to one aspect, the present invention provides a debittered legume protein concentrate obtained by a method comprising the steps of: (i) providing a water suspension of legume material; (ii) debittering the material by mixing with fumaric acid; and (iii) extracting the proteins from the product of step (ii). It will be understood that the product contains a concentration of proteins that is significantly higher than the total protein concentration in the starting material.

According to some embodiments, the legume is selected from the group consisting of: chickpeas, green peas, yellow peas, lentils, peanuts, trefoil, soybeans, pinto beans, Great Northern beans, navy beans, red beans, black beans, dark and light red kidney beans, fava beans, green baby lima beans, pink beans, myasi beans, black eyed beans, cranberry beans, white beans, rice beans, butter beans and any combination thereof. Each possibility represents a separate embodiment of the invention.

According to some embodiments, the legumes are selected from the group consisting of beans, lentils, and combination thereof.

According to some embodiments, the legume is selected from the group consisting of: chickpea, pea, white bean, lentil, peanut, alfalfa, soybean, and any combination thereof. Each possibility represents a separate embodiment of the invention. According to specific exemplary embodiments, the legume is chickpea.

According to some embodiments, the chickpea flour is defatted flour. According to some embodiments, the legume starting material is subjected to an oil separation. The oil separation can be performed with a solvent such as, but not limited to, hexane, petroleum ether, or ethanol.

According to some embodiments, the legume protein concentrate is palatable. In some embodiments, the improved palatability is attributed to debittering with a specific acid. According to additional embodiments, the legume protein concentrate is characterized by a neutral taste.

According to some embodiments, the debittered legume protein concentrate comprises a protein content of at least 60 wt. %, preferably at least 70 wt. % of total dry matter.

According to some embodiments, the protein concentrate comprises a protein content of more than 80% by weight of total dry matter. According to certain embodiments, the protein concentrate comprises a protein content of more than 90% by weight of total dry matter. According to some embodiments, the protein concentrate comprises a protein content of between 75 wt. % and 85 wt. % of total dry matter.

According to some embodiments, the protein concentrate is essentially devoid of bitterness. According to certain exemplary embodiments, the protein concentrate has less bitterness compared to protein concentrates prepared with a process comprising acid protein precipitation with an acid other than fumaric acid.

According to some embodiments, step (ii) comprises mixing the material with fumaric acid.

According to some embodiments, step (iii) comprises subjecting the product of step (ii) to alkaline conditions.

It will be understood that the exposure to acid and alkaline conditions is performed within limits that do not significantly degrade the proteins.

According to some embodiments, the material is legume flour. According to specific embodiments, the material is chickpea flour.

According to some embodiments, step (ii) comprises mixing fumaric acid to a final concentration of between 0.1% and 1% fumaric acid. According to certain embodiments, step (ii) comprises mixing fumaric acid to a final concentration of between 0.15% and 0.6% fumaric acid. According to certain embodiments, step (ii) comprises mixing fumaric acid to a final concentration of about 0.2% fumaric acid. According to additional embodiments, step (ii) comprises mixing fumaric acid to a final concentration of about 0.5% fumaric acid.

According to some embodiments, the soaked chickpea material has between 10 and 25 wt. % solids.

According to some embodiments, step (iii) comprises alkalization to a pH value of between 7.5 and 10. According to certain embodiments, step (iii) comprises alkalization to pH 9. According to certain embodiments, step (iii) comprises alkalization to pH 8.

According to some embodiments, subjecting the product to alkaline conditions comprises the use of NaOH or KOH.

According to some embodiments, step (ii) comprises acidification to about pH 4.5.

According to some embodiments, the method further comprises a step of protein concentration process selected from the group consisting of: membrane distillation, nanofiltration, and evaporation. According to certain embodiments, the method further comprises a membrane distillation process.

According to some embodiments, the debittering step is followed by a separation of the debittered legume material from the water suspension. According to these embodiments, the separated material is subjected to protein extraction. According to certain exemplary embodiments, precipitation is performed by centrifugation.

According to an aspect, the present invention provides a method for manufacturing a chickpea protein concentrate, the method comprising the steps of: (i) providing water soaked chickpea material; (ii) mixing the material with fumaric acid; and (iii) subjecting the product of step (ii) to alkaline conditions.

According to some embodiments, the method further comprises subjecting the chickpea material of step (iii) to a membrane distillation process.

The methods of manufacturing a protein concentrate described herein comprise acidification of liquid soaked chickpea material by fumaric acid, which was found to be superior to other tested conventional acids. Most proteins are insoluble following this step. Acidifying with fumaric acid serves as a debittering step in which a variety of antinutrients are removed. Antinutrients are compounds that interfere with the absorption of nutrients and include, as a non-limiting example, phytic acid.

The alkalizing step is used for resolubilization of the proteins. In this step, remnants of insoluble starch and fibers are removed.

According to some embodiment, subjecting the product to alkaline conditions comprises the use of NaOH or KOH. According to certain embodiment, subjecting the product to alkaline conditions comprises adjusting the pH to 7.5 or higher. According to certain embodiments, subjecting the product to alkaline conditions comprises adjusting the pH to a pH value no higher than 9 or 10. Higher pH may increase hydrolysis of proteins and accordingly, increased bitterness.

The method of manufacturing protein concentrate according to the invention may further comprise a drying step. According to some embodiments, said drying step is performed by spray drying.

The protein concentrate may be pasteurized before being dried. According to some embodiments, the pasteurization step is performed by jet cooking. According to certain embodiments, the pasteurization step is performed by steam-jacketed kettle.

According to an aspect, the present invention provides a food product comprising the chickpea protein concentrate of the invention.

According to some embodiments, the present invention provides meat structured chickpea products that have structures, textures, and other properties that resemble those of animal meat. According to some embodiments, the products comprise fibers and lipid content. They can be devoid of allergenic compounds and of substantial amounts of unhealthy saturated fats and yet provide a similar mouth feel as animal meat.

According to some embodiments, the protein concentrates disclosed herein may serve as a protein component in a variety of food products including, but not limited to, shakes, beverages, sports food, snacks and medical food.

According to some embodiments, the chickpea food product comprises at least 5%, 10%, 15%, 20%, 25%, 30%, 35%, 40%, 45%, 50%, 55%, 60%, 65%, 70%, 75%, 80%, or 85% chickpea protein concentrate as described above. Each possibility represents a separate embodiment of the invention.

The chickpea-based food products provided herein comprise at least about 10% by weight of protein. According to some embodiments, the chickpea-based food products comprise between about 10% and about 90%, between about 20% and about 80%, between about 30% and about 70%, between about 34% and about 50%, between about 30% and about 60%, between about 30% and about 50%, between about 40% and about 50%, between about 60% and about 80%, or between about 70% and about 90% by weight of protein. Protein content of a food product can be determined by a variety of methods, including but not limited to AOAC International reference methods AOAC 990.03 and AOAC 992.15.

The chickpea-based food products provided herein may comprise lipids. Without wishing to be bound by any theory, it is believed that lipids may prevent the sensation of drying during chewing. Examples of suitable lipids include but are not limited to docosahexaenoic acid, eicosapentaenoic acid, conjugated fatty acids, eicosanoids, palmitic acid, glycolipids (e.g., cerebrosides, galactolipids, glycosphingolipids, lipopolysaccharides, gangliosides), membrane lipids (e.g., ceramides, sphingomyelin, bactoprenol), glycerides, second messenger signaling lipid (e.g., diglyceride), triglycerides, prenol lipids, prostaglandins, saccharolipids, oils (e.g., non-essential oils, essential oils, almond oil, aloe vera oil, apricot kernel oil, avocado oil, baobab oil, calendula oil, canola oil, corn oil, cottonseed oil, evening primrose oil, grape oil, grape seed oil, hazelnut oil, jojoba oil, linseed oil, macademia oil, natural oils, neem oil, non-hydrogenated oils, olive oil, palm oil, partially hydrogenated oils, peanut oil, rapeseed oil, sesame oil, soybean oil, sunflower oil, synthetic oils, vegetable oil), omega-fatty acids (e.g., arachidonic acid, omega-3-fatty acids, omega-6-fatty acids, omega-7-fatty acids, omega-9-fatty acids), and phospholipids (e.g., cardiolipin, ceramide phosphocholines, ceramide phosphoethanolamines, glycerophospholipids, phosphatidic acid, phosphatidylcholine, phosphatidylethanolamine, phosphatidylinositol, phosphospingolipids, phosphatidylserine). According to some embodiments, at least some of the lipids are derived from plant. The lipid may be derived from any one plant source or from multiple plant sources. According to some embodiments, the lipid is not derived from a plant source but is identical or similar to lipid found in a plant source, for example, the lipid is synthetically or biosynthetically generated but is identical or similar to lipid found in a plant source. According to some embodiments, the protein fibrous products provided herein comprise between about 1% and about 10%, between about 2% and about 8%, between about 2% and about 6%, between about 2% and about 5%, between about 2% and about 4%, between about 3% and about 6%, between about 3% and about 5%, between about 3% and about 4%, between about 4% and about 5%, or between about 5% and about 10% by weight of lipid. Lipid content of a food product can be determined by a variety of methods, including but not limited to AOAC International reference method AOAC 954.02. According to some embodiments, the meat structured protein products comprise less than about 2%, less than about 1%, less than about 0.5%, less than about 0.25%, less than about 0.1%, or less than about 0.005% by weight of saturated fat.

The chickpea-based food products provided herein may comprise carbohydrate. A variety of ingredients may be used as all or part of the carbohydrate, including but not limited to starch, flour, edible fiber, and any combinations thereof.

According to some embodiments, the protein concentrate does not contain phytoestrogens.

The chickpea based products provided herein comprise a moisture content (MC) of at least about 25%. A high MC may prevent the sensation of drying during chewing. According to some embodiments, the chickpea-based products provided herein comprise a MC of between about 30% and about 70%, between about 40% and about 60%, between about 33% and about 45%, between about 40% and about 50% between about 30% and about 60%, between about 50% and about 70%, or between about 55% and about 65% by weight. In some embodiments, the hydrated protein fibrous products provided herein comprise a MC of between about 50% and about 85%, between about 60% and about 80%, between about 50% and about 70%, between about 70% and about 80%, between about 75% and about 85%, or between about 65% and about 90% by weight.

It is also within the scope of the invention that the chickpea-based food products provided herein comprise small amounts (i.e., 2% or less by weight) of protein, carbohydrate, lipid, or other ingredients derived from animal (e.g., albumin or collagen).

It is also within the scope of the invention that the chickpea-based food products provided herein comprise other vegetal proteins including, but not limited to, soy, barley, canola, lupin, maize, oat, pea, potato, rice, lentil, flaxseed, and wheat proteins. According to some embodiments, the chickpea-based food products comprise up to 50 weight percent of non-chickpea vegetal proteins.

The chickpea food products provided herein have eating qualities and mouth feels that are substantially similar to those of cooked animal meat.

According to some embodiments, the chickpea based food products provided herein are gluten-free. According to some embodiments, the chickpea based food products comprise cross-linking agent that could facilitate filament formation, including but not limited to glucomannan, beta-1, 3-glucan, transglutaminase, polyphenols, calcium salts, and magnesium salts.

Depending on the desired application of the product, the product will preferably also include one or more additives. A wide range of additives may be selected from binding agents, sweeteners (including sugars), flavouring agents and essences, salts, emulsifiers, stabilisers, antioxidants, vitamins, minerals, proteins, colourings, enzymes, flour agents, wetting agents, thickeners, preservatives, acidifiers, herbs, spices, hormones, oligosaccharides, lipids, and microorganisms amongst others. Such additives are known in the art. A useful reference is the Codex General Standard for Food Additives 192-1995 Published by Codex Alimentarius.

Thickening agents may be added to enhance texture characteristics, minimize syneresis and to prevent sedimentation. Conventional food grade thickening agents may be used. These include $\beta$-glucans, carrageenan, xanthan and other gums, pectin, guar locust bean and kon-jac.

Vitamins and minerals may be added as supplements or to meet recommended daily intake. Examples of vitamins and minerals that may be added are vitamins A, including all commonly used retinoids and retinol esters, the B vitamins, C, D, folate, various forms of vitamin E and other water or fat-soluble vitamins. Examples of minerals that may be added are calcium, magnesium, zinc, iron salts as well as various mineral preparations such as natural sea salt.

The chickpea based food products provided herein may be used for preparing nutraceuticals. Nutraceutical products can be designed to provide essential requirements to persons in need thereof. For example, vitamins to those with vitamin deficiencies, iron for anaemia, calcium for bone growth and density, omega-3 for healthy vascular tissue and prevention of coronary heart disease and improved mental health, prebiotics that enhance the presence of microorganisms in the gut such as *Bifidus* sp. and *Acidophilus* sp. for gut or oral health, and hormones such as phytoestrogens which primarily function as antioxidants and/or estrogen mimics with attendant health benefits associated with lower estrogen levels. Accordingly, the products and by products of the invention also have medical and pharmaceutical applications.

The chickpea protein products provided herein may have any shape and form. Exemplary shapes include but are not limited to crumbles, strips, slabs, steaks, cutlets, patties, nuggets, loafs, tube-like, noodle-like, chunks, poppers, and cube-shaped pieces. According to some embodiments, the chickpea protein products have the shape of crumbles with dimensions of between about 2 mm and about 25 mm width, between about 2 mm and about 25 mm thickness, and between about 2 mm and about 50 mm length. According to some embodiments, the chickpea protein products have the shape of strips with widths of between about 1 cm and about 8 cm and lengths of between about 5 cm and about 30 cm. According to some embodiments, the chickpea protein products provided herein have the shape of slabs with widths of between about 30 mm and about 110 cm. According to some embodiments, the chickpea protein products provided herein have a thickness of between about 2 mm and about 15 mm, between about 3 mm and about 12 mm, between about 4 mm and about 10 mm, or between about 5 mm and about 8 mm. In some embodiments, the chickpea protein products provided herein have the same thickness across at least about 95%, at least about 90%, at least about 80%, at least about 70%, at least about 60%, or at least about 50% of their length or width. According to some embodiments, the chickpea protein products provided herein have the same thickness across no more than about 50%, no more than about 40%, no more than about 30%, no more than about 20%, or no more than about 10% of their width or length.

The chickpea protein products can be sliced, cut, ground, shredded, grated, or otherwise processed, or left unprocessed. The chickpea protein products may also be stuffed into permeable or impermeable casings to form sausages. In some embodiments, the chickpea protein products provided herein are shredded and then bound together, chunked and formed, ground and formed, or chopped and formed according in compliance with Food Standards and Labeling Policy Book (USDA, 2005) guidelines.

The chickpea protein products provided herein may be prepared for human or animal consumption. They may be cooked, partially cooked, or frozen either in uncooked, partially cooked, or cooked state. Cooking may include frying either as sautéing or as deep-frying, baking, smoking, steaming, and combinations thereof. According to some embodiments, the chickpea protein products are used in cooked meals, including but not limited to soups, noodles, burritos, chilis, sandwiches, lasagnas, pasta sauces, stews, kebabs, pizza toppings, and meat sticks. According to some embodiments, the chickpea protein products are mixed with other protein products, including but not limited to other plant-derived products and/or animal meat.

Examples of food products which can be produced using the methods of the invention include, but are not limited to, flour, starch, leavened or unleavened breads, pasta, noodles, animal fodder, breakfast cereals, snack foods, cakes, malt, pastries or foods containing flour-based sauces.

The chickpea protein material composition may be used in emulsified meats to provide structure to the emulsified meat, which gives the emulsified meat a firm bite and a meaty texture. The chickpea protein material composition also decreases cooking loss of moisture from the emulsified meat by readily absorbing water, and prevents "fatting out" of the fat in the meat so the cooked meat is juicier.

The meat emulsion may also contain other ingredients that provide preservative, flavoring, or coloration qualities to the meat emulsion. For example, the meat emulsion may contain salt from about 1% to about 4% by weight; spices, from about 0.01% to about 3% by weight; and preservatives such as nitrates, from about 0.01 to about 0.5% by weight.

According to an aspect, the present invention provides a meat- or cheese-like food product comprising at least 10% protein concentrate of the invention. According to some embodiments, the meat-like food product comprises between about 10% and about 75% by weight of protein, between about 0.5% and about 25% by weight of total carbohydrate, between about 0.05% and about 10% by weight of edible fiber, between about 0.1% and about 25% by weight of total lipid, and between about 30% and about 80% by weight of water. According to certain embodiments, the meat-like food product comprises between about 25% and about 65% by weight of protein, between about 1% and about 10% by weight of total carbohydrate, between about 0.1% and about 5% by weight of edible fiber, between about 1% and about 5% by weight of total lipid, and between about 40% and about 60% by weight of water.

According to some embodiments, the food product comprises between about 0.1% to about 10% by weight of one or more binding agents. According to some embodiments, the food product comprises between about 0.5% to about 5% by weight of one or more binding agents. According to additional embodiments, the food product comprises at least about 0.01%, between about 0.01% and about 15%, between about 0.1% and about 10%, between about 0.25% and about 7%, between about 0.25% and about 5%, between about 0.5% and about 4.5%, between about 1% and about 4%, between about 1.5% and about 3.5%, between about 2% and about 3%, between about 1% and about 2.5%, between about 2% and about 2.5%, between about 0.5% and about 2%, or between about 5% and about 10% by weight of binding agents. Each possibility represents a separate embodiment.

The food products provided herein can optionally comprise at least about 0.05% by weight of carbohydrate. A variety of ingredients may be used as all or part of the carbohydrate, including but not limited to starch, flour, edible fiber, and combinations thereof. Examples of suitable starches include but are not limited to maltodextrin, inulin, fructooligosaccharides (FOS), pectin, carboxymethyl cellulose, guar gum, corn starch, oat starch, potato starch, rice starch, pea starch, and wheat starch. Examples of suitable flours include but are not limited to amaranth flour, oat flour, quinoa flour, rice flour, rye flour, sorghum flour, soy flour, wheat flour, and corn flour. Examples of suitable edible fiber include but are not limited to bamboo fiber, barley bran, carrot fiber, citrus fiber, corn bran, soluble dietary fiber, insoluble dietary fiber, oat bran, pea fiber, rice bran, head husks, soy fiber, soy polysaccharide, wheat bran, and wood pulp cellulose. The carbohydrate may be derived from any one natural or modified natural source or from multiple natural or modified natural sources. According to some embodiments, the carbohydrate is not derived from a natural or modified natural source but is identical or similar to carbohydrate found in a natural source, for example, the carbohydrate is synthetically or biosynthetically generated but comprises molecules that have an identical or similar primary structure as molecules found in a natural source. According to certain embodiments, at least some of the carbohydrate is derived from plant. According to some specific embodiments, at least some of the carbohydrate is derived from pea. According to some embodiments, the food product comprises between about 0.1% and about 25%, between about 3% and about 20%, between about 5% and about 15%, between about 5% and about 10%, between about 4% and about 7%, or between about 3% and about 35% by weight of carbohydrate. According to some embodiments, the food product comprises between about 0.1% and about 10%, between about 1% and about 8%, between about 2% and about 6%, or between about 3% and about 4.5% by weight of fiber. According to some embodiments, the food products provided herein comprise between about 0.1% and about 25%, between about 1% and about 10%, between about 2% and about 9%, between about 1% and about 5%, between about 2% and about 4%, between about 1% and about 3%, between about 5% and about 15%, between about 0.1% and about 10%, between about 0.1% and about 5%, between about 0.1% and about 2.5%, between about 0.1% and about 1.5%, between about 1% and about 3%, between about 4% and about 7%, or between about 2.5% and about 7.5% by weight of plant carbohydrate. According to some embodiments, the food product comprises between about 0.1% and about 15%, between about 0.5% and about 15%, between about 3% and about 15%, between about 5% and about 15%, between about 10% and about 15%, between about 0.1% and about 3%, between about 1% and about 3%, between about 2% and about 3%, 0.1% to about 1.5%, between about 0.5% and about 1.5%, or between about 1% and about 1.5% by weight of plant starch. According to some embodiments, the food product comprises pea starch. According to some embodiments, the food product comprises between about 0.1% and about 3%, between about 1% and about 3%, between about 2% and about 3%, between about 0.1% and about 1.5%, between about 0.5% and about 1.5%, or between about 1% and about 1.5% by weight of *Pisum sativum* starch. According to certain embodiments, the food product comprises between about 0.1% and about 10%, between about 0.1% and about 5%, between about 0.1% and about 3%, between about 0.1% and about 2%, between about 0.4% and about 0.6%, between about 0.05% and about 2.5%, between about 0.05% and about 1.5%, between about 0.05% and about 1%, or between about 0.05% and about 0.5% by weight of plant edible fiber. According to some embodiments, the food product comprises edible pea fiber. According to certain embodiments, the food product comprises between 0.1% and about 10%, between about 0.1% and about 5%, between about 0.1% and about 3%, between about 0.1% and about 2%, between about 0.4% and about 0.6%, between about 0.05% and about 2.5%, between about 0.05% and about 1.5%, between about 0.05% and about 1%, or between about 0.05% and about 0.5% by weight of *Pisum sativum* edible fiber.

Examples of suitable binding agents include but are not limited to purees (e.g., bean puree, sweet potato puree, pumpkin puree, applesauce, yam puree, banana puree, plantain puree, date puree, prune puree, fig puree, zucchini puree, carrot puree, coconut puree), native or modified starches (e.g., starches from grains, starches from tuber, potato starch, sweet potato starch, corn starch, waxy corn starch, tapioca starch, tapioca, arrowroot starch, taro starch, pea starch, chickpea starch, rice starch, waxy rice starch, lentil starch, barley starch, sorghum starch, wheat starch, and physical or chemical modifications thereof [including, e.g., pre-gelatinized starch, acetylated starch, phosphate bonded starch, carboxymethylated starch, hydroxypropylated starch]), flours derived from grains or legumes or roots (e.g., from taro, banana, jackfruit, konjac, lentil, fava, lupin bean, pea, bean, rice, wheat, barley, rye, corn, sweet rice, soy, teff, buckwheat, amaranth, chickpea, sorghum, almond, chia seed, flaxseed, potato, tapioca, potato), beta-glucans (e.g., from bacteria [e.g., curdlan], oat, rye, wheat, yeast, barley, algae, mushroom), gums (e.g., xanthan gum, guar gum, locust bean gum, gellan gum, gum arabic, vegetable gum, tara gum, tragacanth gum, konjac gum, fenugreek gum, gum karaya, gellan gum, high-acetyl gellan gum, low-acetyl gellan gum), native or relatively folded (i.e., not fully in the native functional state but not fully denatured) proteins (e.g., fava protein, lentil protein, pea protein, ribulose-1,5-bisphosphate carboxylase/oxygenase [Rubisco], chickpea protein, mung bean protein, pigeon pea protein, lupin bean protein, soybean protein, white bean protein, black bean protein, navy bean protein, adzuki bean protein, sunflower seed protein), polysaccharides and modified polysaccharides (e.g., methylcellulose, hydroxypropyl methylcellulose, carboxymethyl cellulose, maltodextrin, carrageenan and its salts, alginic acid and its salts, agar, agarose, agaropectin, pectin, alginate), nut and seed butters (e.g., almond butter, cashew butter, hazelnut butter, macadamia nut butter, peanut butter, pecan butter, pistachio butter, walnut butter, pumpkin seed butter, sesame seed butter, soybean butter, sunflower seed butter), enzymes (e.g., transglutaminase, thio-oxidoreductase), prolamin, gelatin, egg protein, potato flakes, okra, tubers, fibers (e.g., psyllium husk), and derivatives and combinations thereof.

According to some embodiments, the food product comprises only organic ingredients. According to some embodiments, the food product comprises no gluten. According to some embodiments, the food product comprises no soy.

According to some embodiments, the food products have cooking times of about 10 min or less, about 8 min or less, or about 6 min or less.

According to some embodiments, the chickpea protein products provided herein are produced by thermoplastic extrusion. Thermoplastic extrusion (also known as extrusion cooking) is a process wherein a dry mix (e.g., protein, carbohydrate, lipid) and a liquid mix (e.g., water) are fed into a closed barrel. The barrel contains one or more screw shafts that mix the mixture into a dough, convey the dough forward, and impart shear/mechanical pressure. As the dough advances along successive zones of the barrel, pressure and heat are increased, and the dough is converted into a thermoplastic melt in which proteins undergo extensive heat denaturation (causing structural changes such as breakage of hydrophobic and hydrogen bonds, hydrolysis of disulfide bonds, and formation of new covalent and non-covalent bonds). The directional shear force furthermore causes alignment of the high molecular components in the melt, leading to the formation of aligned protein fibers. When the mass is finally pushed through a cooling die, the newly generated structure is fixed in a final protein fibrous product. The protein fibrous product can be formed into any shape by using a suitable cooling die configuration, and can be cut to any size, for example by a blade chopper.

Any physiochemical parameter or extruder configuration parameter may influence the appearance, texture, and properties of the chickpea protein product. The physiochemical parameters include but are not limited to the formulation of the dough (e.g., protein type and content, carbohydrate type and content, lipid type and content, water content, other ingredients) and the cooking temperature.

The extruder may be selected from any commercially available extruder. Suitable extruders include but are not limited to the extruders described in U.S. Pat. Nos. 4,600, 311; and 4,118,164, and commercially available extruders such as the MPF 50/25 (APV Baker Inc., Grand Rapids, Mich.), BC-72 (Clextral, Inc., Tampa, FL), TX-57 (Wenger Manufacturing, Inc., Sabetha, Kans.), TX-168 (Wenger Manufacturing, Inc., Sabetha, Kans.), and TX-52 models (Wenger Manufacturing, Inc., Sabetha, Kans.).

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

Examples

Example 1—Reducing Bitterness of Chickpea Flour

To remove chemical compounds that have a bitter taste, such as saponins, the chickpea protein was extracted in acid conditions. Chickpea flour was mixed with $H_2O$ or distilled $H_2O$ (ratio 1:10) and brought to homogenization using a magnetic stirrer (MR3001, Heidolph instruments, Schwabach, GER). Sulfuric acid ($H_2SO_4$), phosphoric acid ($H_3PO_4$), hydrochloric acid (HCl), fumaric acid, or citric acid was used to adjust the pH to 4.5. At this pH, most antinutritive and bitter components are soluble, whereas the proteins are insoluble. The composition was extracted on a magnetic stirrer for three hours, followed by centrifugation at 8000×g for 20 minutes. The supernatant was discarded, and the sediment was suspended and washed with water. Next, the mixture was centrifuged at 8000×g for about ten minutes; the sediment was weighed and stored for sensory evaluation. Table 1 shows the experimental design and results of the debittering process.

Sensory Evaluation

A panel of five experts evaluated all produced sediments. Bitterness was assessed using a descriptive test. The selection of the most neutral sediments was subjected to the second extraction step, the protein extraction. As can be seen in Table 1, fumaric acid and HCl were regarded as the most acceptable in terms of bitterness.

TABLE 1

Comparison of extracting agents for debittering process

| Trial | Description | Chickpea flour [g] | Water [g] | Pellet [g] | Sensory evaluation (taste) |
|---|---|---|---|---|---|
| 1 | $H_2SO_4$ + distilled $H_2O$ | 50.16 | 500.32 | 79.5 | Sour, sulfuric smell, foul-smelling |
| 2 | $H_2SO_4$ + H2O | 50.62 | 513.47 | 72.49 | Sour, sulfuric smell, foul-smelling |
| 3 | $H_3PO_4$ + distilled H2O | 50.2 | 509.1 | 74.9 | Sour, bitter in aftertaste |
| 4 | $H_3PO_4$ + H2O | 50.24 | 500.65 | 81.4 | Sour, bitter in aftertaste |
| 5 | HCl + distilled H2O | 50.65 | 506.62 | 77.9 | Neutral |
| 6 | HCl + H2O | 50.81 | 511.6 | 79.89 | Neutral |
| 7 | Fumaric acid + distilled H2O | 50.22 | 503.45 | 76.48 | Neutral |
| 8 | Fumaric acid + H2O | 50.22 | 508.32 | 63.43 | Neutral |
| 9 | Citric acid + distilled H2O | 50.82 | 501.15 | 70.46 | Very bitter, especially in the aftertaste |

TABLE 1-continued

Comparison of extracting agents for debittering process

| Trial | Description | Chickpea flour [g] | Water [g] | Pellet [g] | Sensory evaluation (taste) |
|---|---|---|---|---|---|
| 10 | Citric acid + H2O | 50.3 | 507.5 | 57.46 | Very bitter, especially in the aftertaste |

Example 2—Protein Extraction

The debittered sediments from example 1 were subjected to an alkaline protein extraction. Since fumaric acid and HCl were found to be acceptable in terms of bitterness reduction, they were subjected for further analysis. For extraction of protein, the sediments were dissolved in $H_2O$ at a ratio of 1:8. The sediment-water mixtures were adjusted to different pHs (7.5-10) using sodium hydroxide (NaOH) or potassium hydroxide (KOH). After stirring overnight at room temperature, the mixture was centrifuged at 8000×g for 20 minutes. The content of the supernatant and sediment was evaluated. Approximately 3 g of sample was weighted into dried petri dishes, and dried with open cover at 103° C. for one hour in a drying oven (Memmert GmbH & Co. KG, Schwabach). The petri dishes were cooled to room temperature in an exsiccator and weight loss was recorded. The drying procedure was repeated until there was no weight loss or the weight increased again because of oxidation processes in the oven. The dry matter content was calculated using the following equation:

$$TM = \frac{G_T - G_L}{G_E} * 100$$

Figure 1:
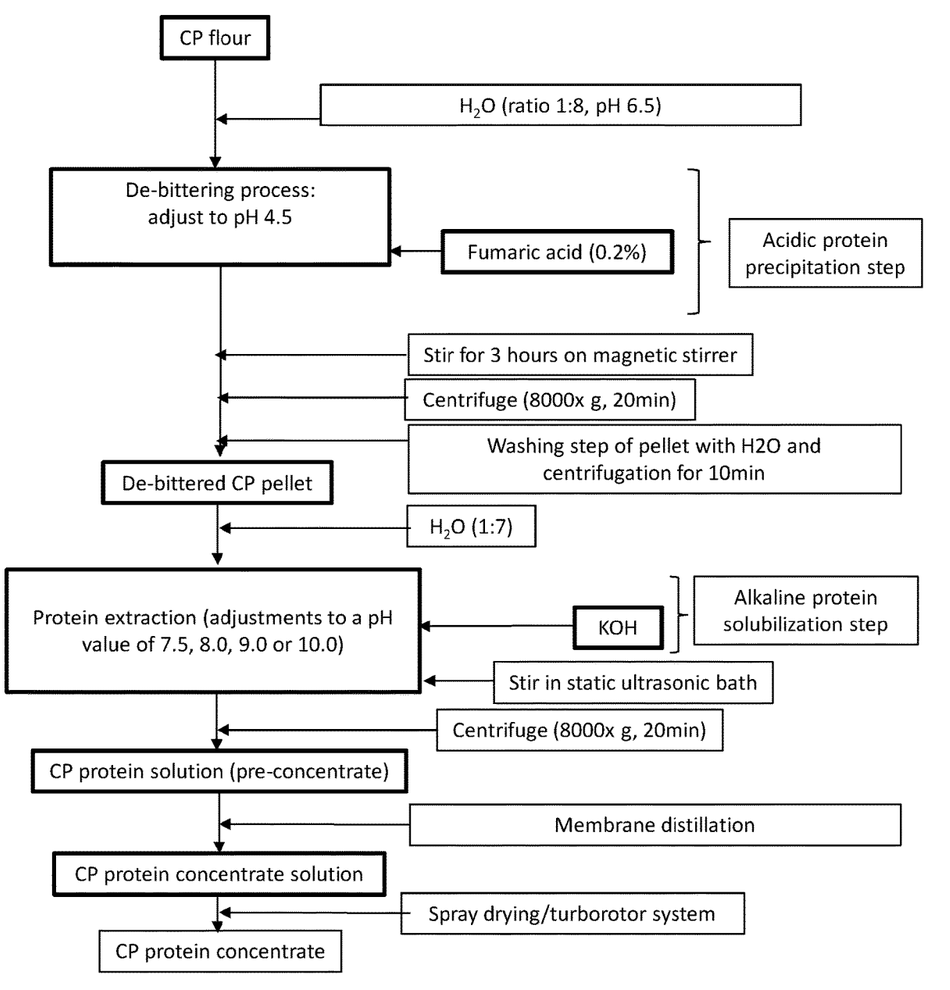
FIG. 1 shows a schematic workflow of a typical manufacturing process of chickpea protein concentrate.

GT=weight of sample+petri dish after drying
GL=tare weight of petri dish
GE=sample weight The protein content in the dry matter was determined using the Kjeldahl method. Table 2 depicts the protein content (%) in the dry matter of the supernatant after centrifugation in the different trials. As shown in Table 2, all protein extraction procedures resulted in dry matter having >70% protein content. In addition, the use of fumaric acid for the de-bittering process produce higher extraction yield at lower pH, as well as better taste. An exemplary workflow of the chickpea protein concentrate process is depicted in FIG. 1.

TABLE 2 experimental design of the comparison of extraction agents

| Trial | Acid De-bittering Process | Base Protein Extraction | pH-Value | % Protein in Dry Matter |
|---|---|---|---|---|
| 1.1 | Fumaric acid | NaOH | 7.5 | 76.7 |
| 1.2 | Fumaric acid | NaOH | 8.0 | 93.5 |
| 1.3 | Fumaric acid | NaOH | 8.5 | 100.9 |
| 2.1 | Fumaric acid | KOH | 7.5 | 80.9 |
| 2.2 | Fumaric acid | KOH | 8.0 | 86.5 |
| 2.3 | Fumaric acid | KOH | 8.5 | 88.5 |
| 3.1 | HCl | NaOH | 7.5 | 72.6 |
| 3.2 | HCl | NaOH | 8.0 | 74.6 |
| 3.3 | HCl | NaOH | 8.5 | 87.1 |
| 4.1 | HCl | KOH | 7.5 | 86.9 |
| 4.2 | HCl | KOH | 8.0 | 87.6 |
| 4.3 | HCl | KOH | 8.5 | 69.8 |
| 5.1 | Fumaric acid | NaOH | 10.0 | 77.6 |
| 5.2 | Fumaric acid | KOH | 10.0 | 76.4 |
| 5.3 | HCl | NaOH | 10.0 | 78.7 |
| 5.4 | HCl | KOH | 10.0 | 85.4 |
| 5.5 | HCl | NaOH | 9.0 | 87.4 |
| 5.6 | HCl | KOH | 9.0 | 75.8 |
| 5.7 | Fumaric acid | NaOH | 9.0 | 83.4 |
| 5.8 | Fumaric acid | KOH | 9.0 | 73.0 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A method for manufacturing a debittered chickpea protein concentrate, the method comprising the steps of: (i) providing a water suspension of chickpea material; (ii) debittering the chickpea material; and (iii) extracting the proteins from the product of step (ii); wherein step (ii) comprises mixing the material with fumaric acid.

2. The method of claim 1, wherein step (iii) comprises subjecting the product of step (ii) to alkaline conditions.

3. The method of claim 1, wherein step (ii) comprises mixing fumaric acid to a final concentration of between 0.2% and 1% fumaric acid.

4. The method of claim 1, said method further comprises a step of concentrating proteins by a process selected from the group consisting of: membrane distillation, nanofiltration, ultrafiltration, diafiltration, and evaporation.

* * * * *